US009699338B2

(12) United States Patent
Hirota (10) Patent No.: US 9,699,338 B2
(45) Date of Patent: Jul. 4, 2017

(54) IMAGE FORMING APPARATUS (71) Applicant: KYOCERA Document Solutions Inc., Osaka (JP)

(72) Inventor: Masato Hirota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/159,024

(22) Filed: May 19, 2016

(65) Prior Publication Data
US 2016/0352941 A1 Dec. 1, 2016

(30) Foreign Application Priority Data
May 25, 2015 (JP) ................................. 2015-105094

(51) Int. Cl.
H04N 1/00 (2006.01)
H04N 1/44 (2006.01)
(52) U.S. Cl.
CPC ....... H04N 1/00663 (2013.01); H04N 1/0032 (2013.01); H04N 1/00037 (2013.01); H04N 1/00079 (2013.01); H04N 1/00633 (2013.01); H04N 1/4413 (2013.01); H04N 2201/0094 (2013.01)
(58) Field of Classification Search
USPC ....................................................... 358/1.15
See application file for complete search history.

(56) References Cited

U.S. PATENT DOCUMENTS

2008/0193146 A1* 8/2008 Yamada ................. G03G 15/50
399/79
2015/0249752 A1* 9/2015 Imai .................... H04N 1/00042
358/1.15

FOREIGN PATENT DOCUMENTS

| JP | 2008-134379 A | 6/2008 |
|----|---------------|--------|
| JP | 2011-118734 A | 6/2011 |
| JP | 2011-194665 A | 10/2011 |
| JP | 2012-076383 A | 4/2012 |

* cited by examiner

Primary Examiner — Ngon Nguyen
(74) Attorney, Agent, or Firm — Studebaker & Brackett PC (57) ABSTRACT

An image forming apparatus includes an exit tray, an image forming section, a user identification section, a printed sheet receipt managing section, and a fetch sensor. The image forming section performs a printing operation based on a print instruction issued from a user. The fetch sensor is capable of detecting that a printed sheet has been fetched from the exit tray. The user identification section identifies a print requester corresponding to a user having issued a print instruction, and a fetcher corresponding to a user fetching the printed sheet from the exit tray. If the printed sheet is fetched from the exit tray and the fetcher is different from the print requester, the printed sheet receipt managing section sends, to a computer of the user, a notice of printed sheet taken away notifying that the printed sheet has been taken away.

4 Claims, 10 Drawing Sheets

IMAGE FORMING APPARATUS

INCORPORATION BY REFERENCE

The present application claims priority under 35 U.S.C. §119 to Japanese Patent Application No. 2015-105094, filed on May 25, 2015. The contents of this application are incorporated herein by reference in their entirety.

BACKGROUND

The present disclosure relates to an image forming apparatus causing a printed sheet output therefrom to be fetched.

If a given user causes an image forming apparatus to print a printed sheet, the printed sheet ejected onto an exit tray of the image forming apparatus may be taken away by another user. Various techniques have been employed for avoiding such situations.

In a first typical technique, a printer user specifies a receiver of a printed sheet in issuing a print instruction to an image forming apparatus. Thus, the receiver is granted authority to eject the printed sheet from the image forming apparatus. Through personal identification performed by an identification device, the receiver can receive the printed sheet.

In a second typical technique, a user issues a print instruction to an image forming apparatus. The image forming apparatus records, on a recording sheet, an ID (identification) peculiar to the user having issued the print instruction. The image forming apparatus determines, by reading the ID from the recording sheet, whether or not the recording sheet loaded on an exit tray has been removed.

If the recording sheet has been removed, or if the recording sheet has not been removed, the image forming apparatus sends, to a destination specified by the user in issuing the print instruction, a notice that the recording sheet has been removed, or that the recording sheet has not been removed.

In a third typical technique, in transmitting a print instruction from a client terminal to an image forming apparatus, processing information is transmitted together with the print instruction. The processing information corresponds to processing to be executed if a printed sheet is forgotten to be fetched. The processing information is printed on the printed sheet. If a user forgets to fetch the printed sheet from an exit tray, the image forming apparatus reads the processing information printed on the printed sheet left in the exit tray to execute the processing corresponding to the processing information.

In a fourth typical technique, the security of printed sheets is improved by using a security exit section in the shape of a lockable box. For example, in a case where printed sheets printed for two or more users are ejected onto the security exit section, if one user opens the security exit section through identification, and takes all the printed sheets away, a screen warning that the user may have taken away printed sheets of the other user(s) together with his/her printed sheet is displayed on a PC (personal computer) of the user having taken away the printed sheets.

SUMMARY

An image forming apparatus according to an embodiment of the present disclosure includes an exit tray, a network interface circuit, a storage device, an image forming section, a user identification section, a printed sheet receipt managing section, and a fetch sensor. A printed sheet is output to the exit tray. The network interface circuit communicates with an outside device. The storage device stores user information to be used in identifying a user. The image forming section performs a printing operation based on a print instruction issued from a computer used by a user, and outputs, to the exit tray, a printed sheet printed based on the print instruction. The user identification section identifies the user by using the user information. The printed sheet receipt managing section sends, to the computer, a print completion notice corresponding to completion of the printing operation. The fetch sensor is capable of detecting that the printed sheet has been fetched from the exit tray. The user identification section identifies a print requester corresponding to the user having issued the print instruction, and a fetcher corresponding to a user fetching the printed sheet from the exit tray. In a situation in which the printed sheet is fetched from the exit tray and the fetcher is different from the print requester, the printed sheet receipt managing section sends, to the computer, a notice of printed sheet taken away notifying that the printed sheet has been taken away.

DETAILED DESCRIPTION

An embodiment of the present disclosure will now be described with reference to the accompanying drawings.

Overview

An overview of an image formation system according to the embodiment of the present disclosure will be first described. FIGS. 1 to 5 are diagrams used for describing the overview of the image formation system according to the embodiment of the present disclosure.

(Example of Normal Printed Sheet Fetch)

Figure 1:
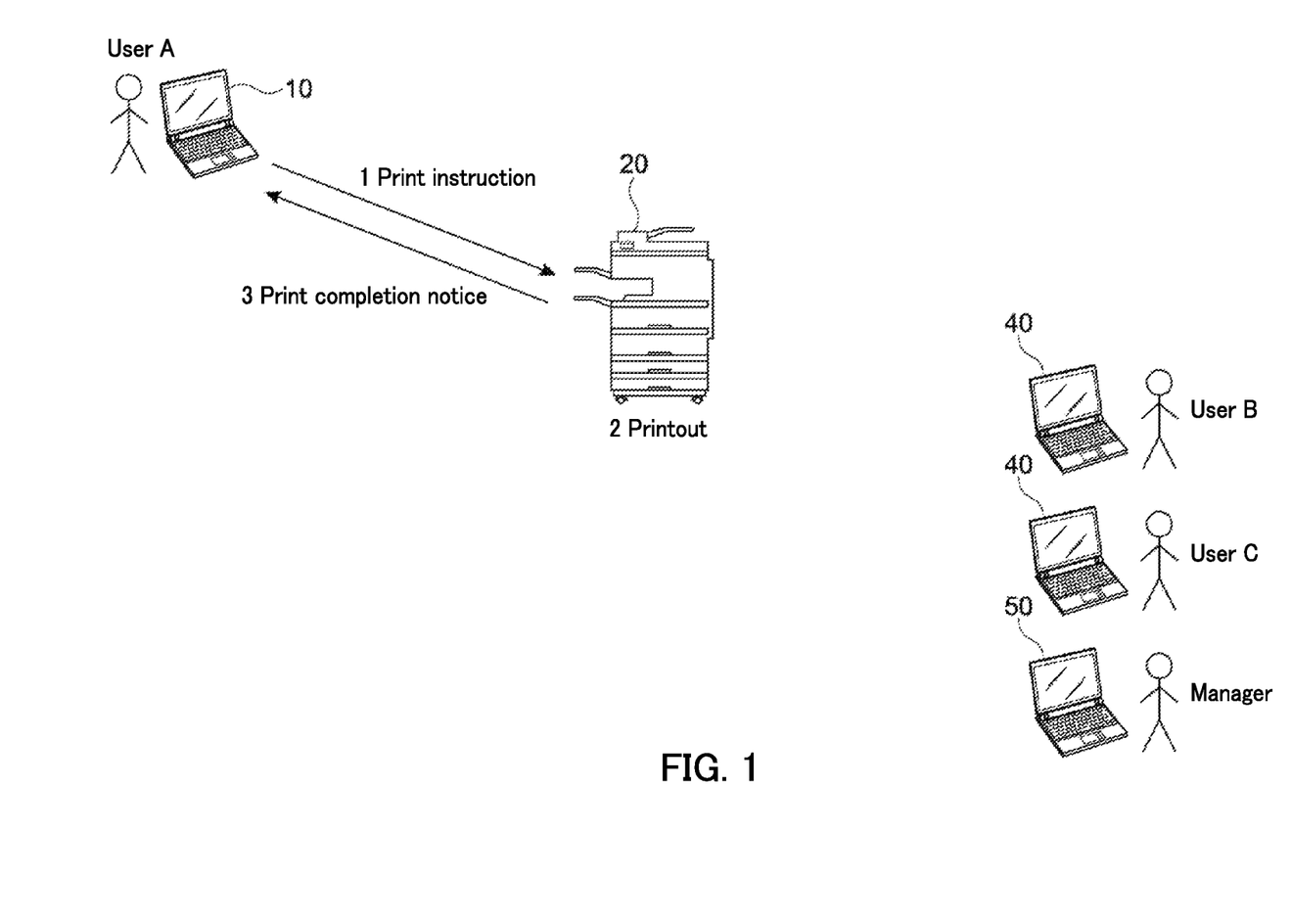
FIG. 1 illustrates workflow from when one user issues a print instruction to an image forming apparatus to when the user receives a print completion notice.

First, referring to FIGS. 1 and 2, a specific example in which a printed sheet printed by an image forming apparatus is suitably fetched by a proper user will be described. Hereinafter, a printed sheet printed by an image forming apparatus based on a print instruction issued by a user is sometimes designated as the "printed sheet of the user". FIG. 1 illustrates workflow from when one user A issues a print instruction to an image forming apparatus 20 to when the user receives a print completion notice.

As illustrated in FIG. 1, the user A uses a PC (personal computer) 10 to send a print instruction to the image forming apparatus (or a multifunction peripheral: MFP) 20. The user A corresponds to an example of a print requester. On receiving the print instruction, the image forming apparatus 20 performs a printing operation based on the print instruction. A resultant printed sheet is output to an exit tray (printout). After outputting the printed sheet to the exit tray, the image forming apparatus 20 sends a print completion notice to the PC 10. Thus, the user A can receive the print completion notice.

In the exemplified system illustrated in FIG. 1, the image forming apparatus 20 is used also by users B and C different from the user A. The users B and C respectively use PCs 40. Besides, in the system illustrated in FIG. 1, there is a manager of the image forming apparatus 20. The manager of the image forming apparatus 20 uses a PC 50 to manage the image forming apparatus 20.

Figure 2:
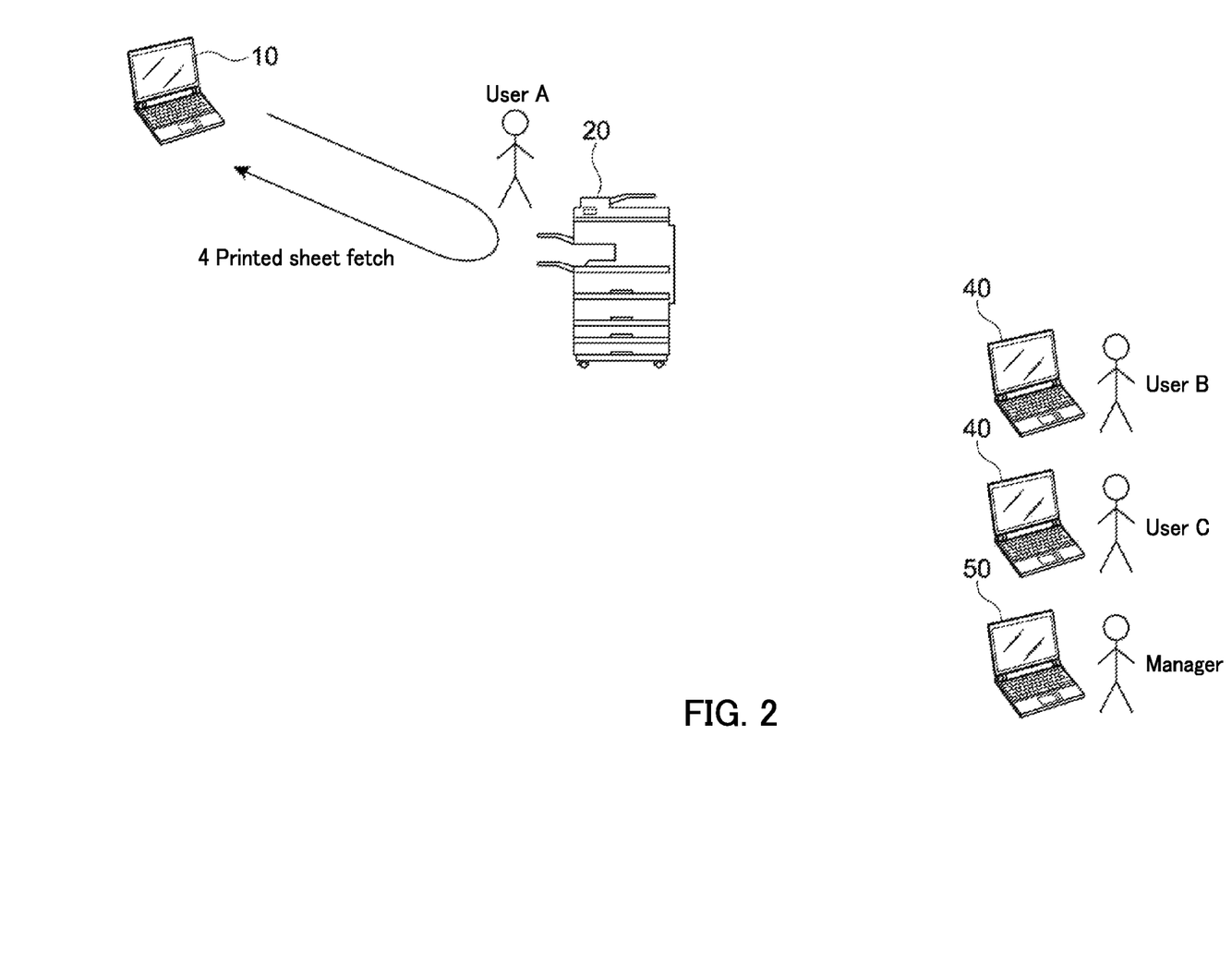
FIG. 2 illustrates workflow from when the user having received the print completion notice comes to an installation position of the image forming apparatus to when the user comes back to his/her desk after fetching a printed sheet.

As illustrated in FIG. 2, when the user A having issued the print instruction receives the print completion notice from the image forming apparatus 20, the user A comes to an installation position of the image forming apparatus 20. The user A fetches the printed sheet of the user A output to the exit tray of the image forming apparatus 20 and returns to his/her desk.

What has been described is a specific example in which a printed sheet printed based on a print instruction issued by a user is suitably fetched by the (proper) user.

(Example of Printed Sheet Taken Away by Mistake)

Figure 3:
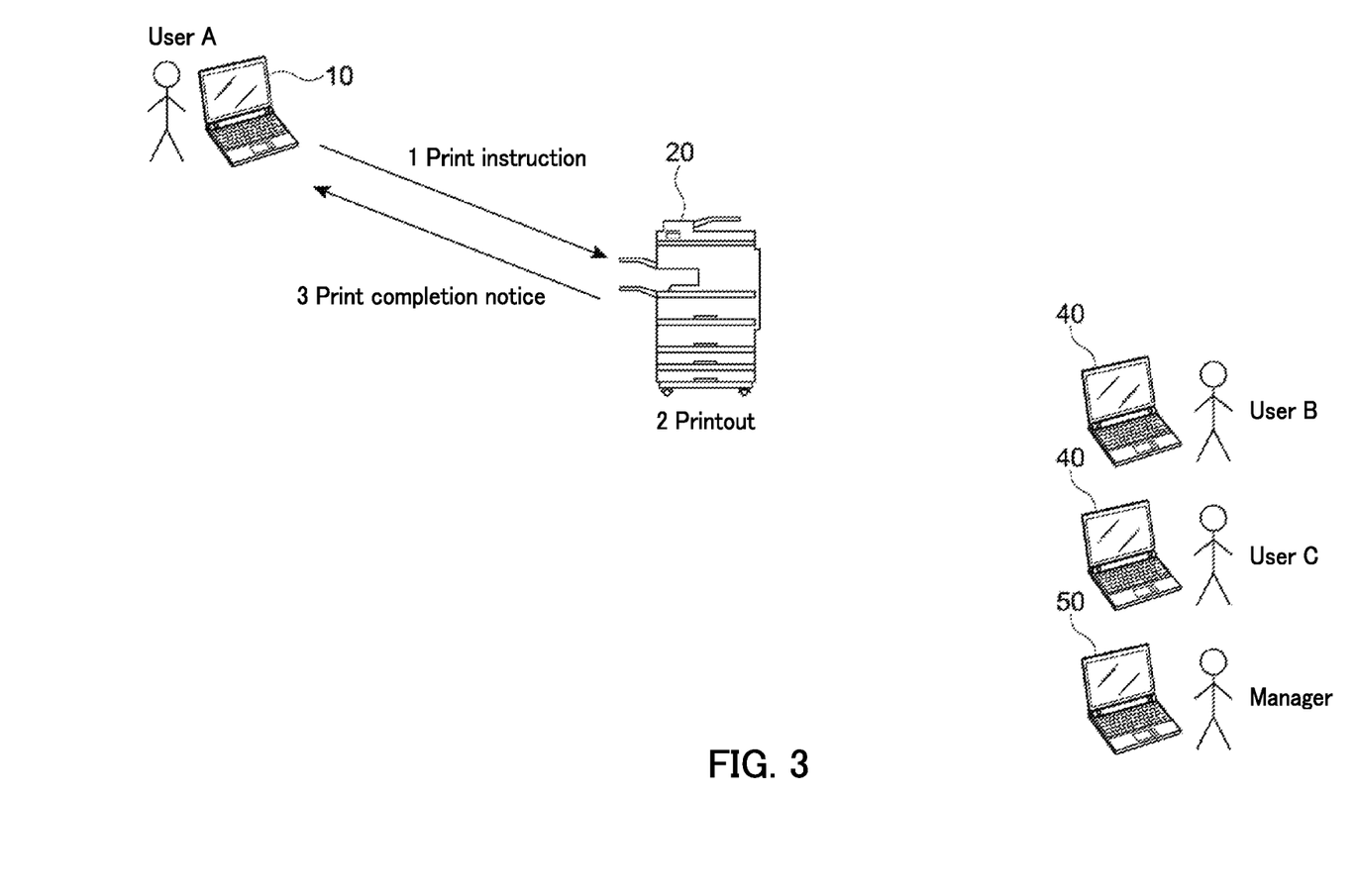
FIG. 3 illustrates workflow from when one user issues a print instruction to an image forming apparatus to when the user receives a print completion notice.

Next, a case where a printed sheet is taken away by a user different from a user having issued a print instruction will be described. FIG. 3 is a diagram illustrating workflow from when the user A issues a print instruction to the image forming apparatus 20 to when a print completion notice is received. It is noted that the workflow from the issue of the print instruction to the receipt of the print completion notice is the same as that described with reference to FIG. 1.

In an exemplified case illustrated in FIG. 3, it is assumed that the user A does not fetch the printed sheet immediately after receiving the print completion notice.

Thereafter, the user B issues, through the PC 40, another print instruction to the image forming apparatus 20. The image forming apparatus 20 sends a print completion notice to the PC 40 used by the user B. On receiving the print completion notice, the user B comes to the installation position of the image forming apparatus 20 to fetch the printed sheet. Here, the user B fetches (takes away) also the printed sheet of the user A by mistake.

Figure 4:
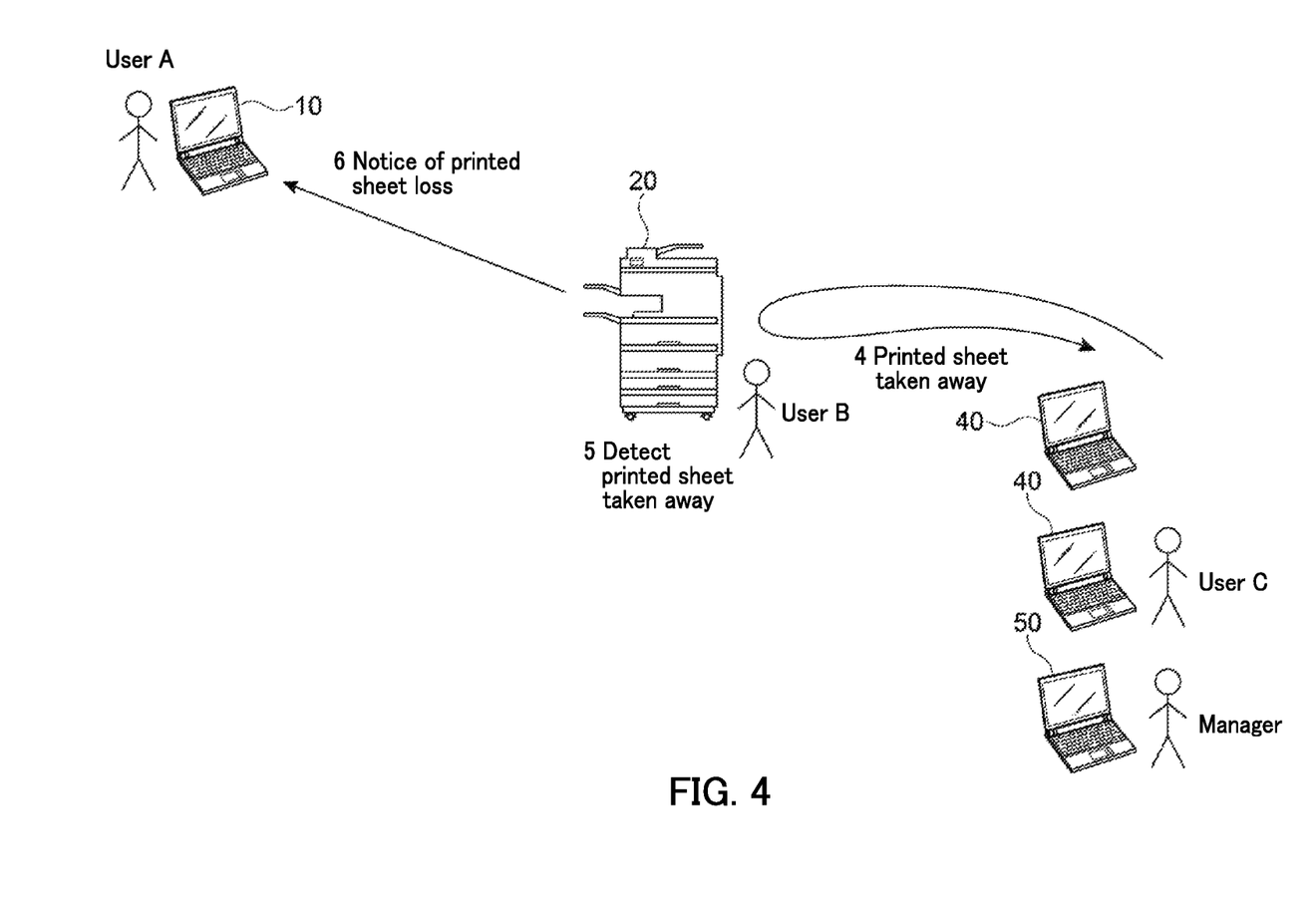
FIG. 4 illustrates workflow employed, in a situation in which a different user takes away a printed sheet of a given user, until the given user is notified that his/her printed sheet has been taken away.

When the user B fetches the printed sheets from the exit tray, the image forming apparatus 20 detects that the exit tray is empty. The image forming apparatus 20 informs the PC 10 of the user A that the printed sheet of the user A has been taken away (a notice of printed sheet taken away). Thus, the user A can receive the notice of printed sheet taken away.

Figure 5:
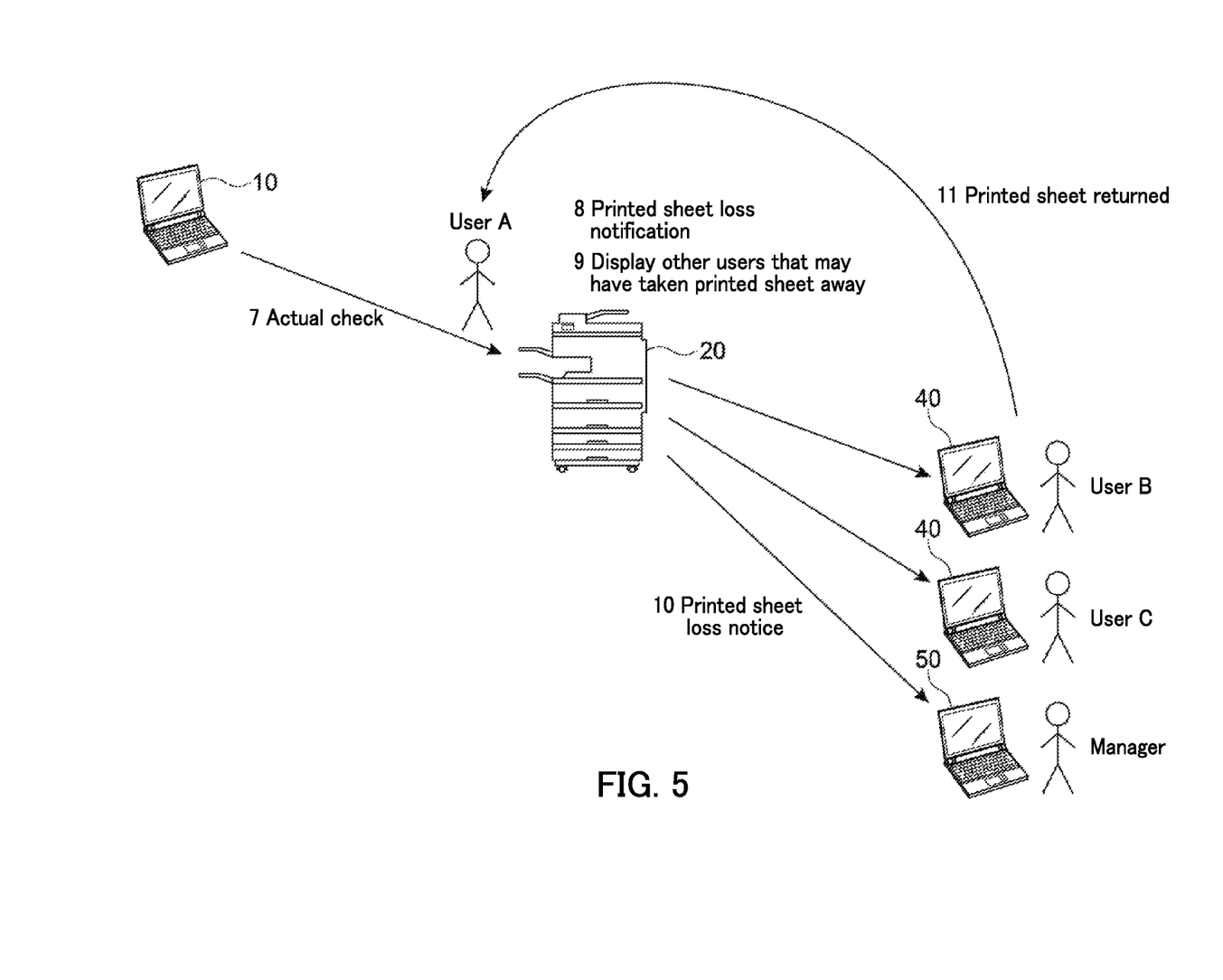
FIG. 5 illustrates workflow employed until the printed sheet is returned to the given user notified that the printed sheet has been taken away.

On receiving the notice of printed sheet taken away, the user A comes to the installation position of the image forming apparatus 20 as illustrated in FIG. 5 to check whether or not his/her printed sheet is left around the image forming apparatus 20, namely, whether or not his/her printed sheet has been actually taken away (actual check).

Incidentally, if the user B is a proxy requested by the user A to fetch the printed sheet of the user A, the user A knows that the user B fetches the printed sheet of the user A. Accordingly, the user A waits for the user B to deliver the printed sheet of the user A to the user A. In other words, the user A does not come to the installation position of the image forming apparatus 20 to fetch the printed sheet of the user A.

If the printed sheet of the user A has been taken away from the image forming apparatus 20, the user A reports, to the image forming apparatus 20, loss of the printed sheet (a printed sheet loss issue).

When the printed sheet loss issue is accepted, the image forming apparatus 20 presents, based on identification history, other users that may have taken away the printed sheet of the user A to the user A. The identification history refers to history of identification performed on the users in the image forming apparatus 20 when the users fetch printed sheets from the image forming apparatus 20.

Besides, the image forming apparatus 20 sends a printed sheet loss notice to the PCs 40 and 50 used by prescribed party (herein, the user B, the user C and the manager).

In this exemplified case, the printed sheet loss notice is sent also to the user B having taken away the printed sheet of the user A. Therefore, the user B perceives that he/she has taken away the printed sheet of the user A. As a result, the user B returns the printed sheet to the user A.

What has been described is an example where a printed sheet has been taken away by a user different from a user having issued a print instruction.

This is the overview of the image formation system according to the embodiment of the present disclosure.

Configuration of Image Forming Apparatus

Figure 6:
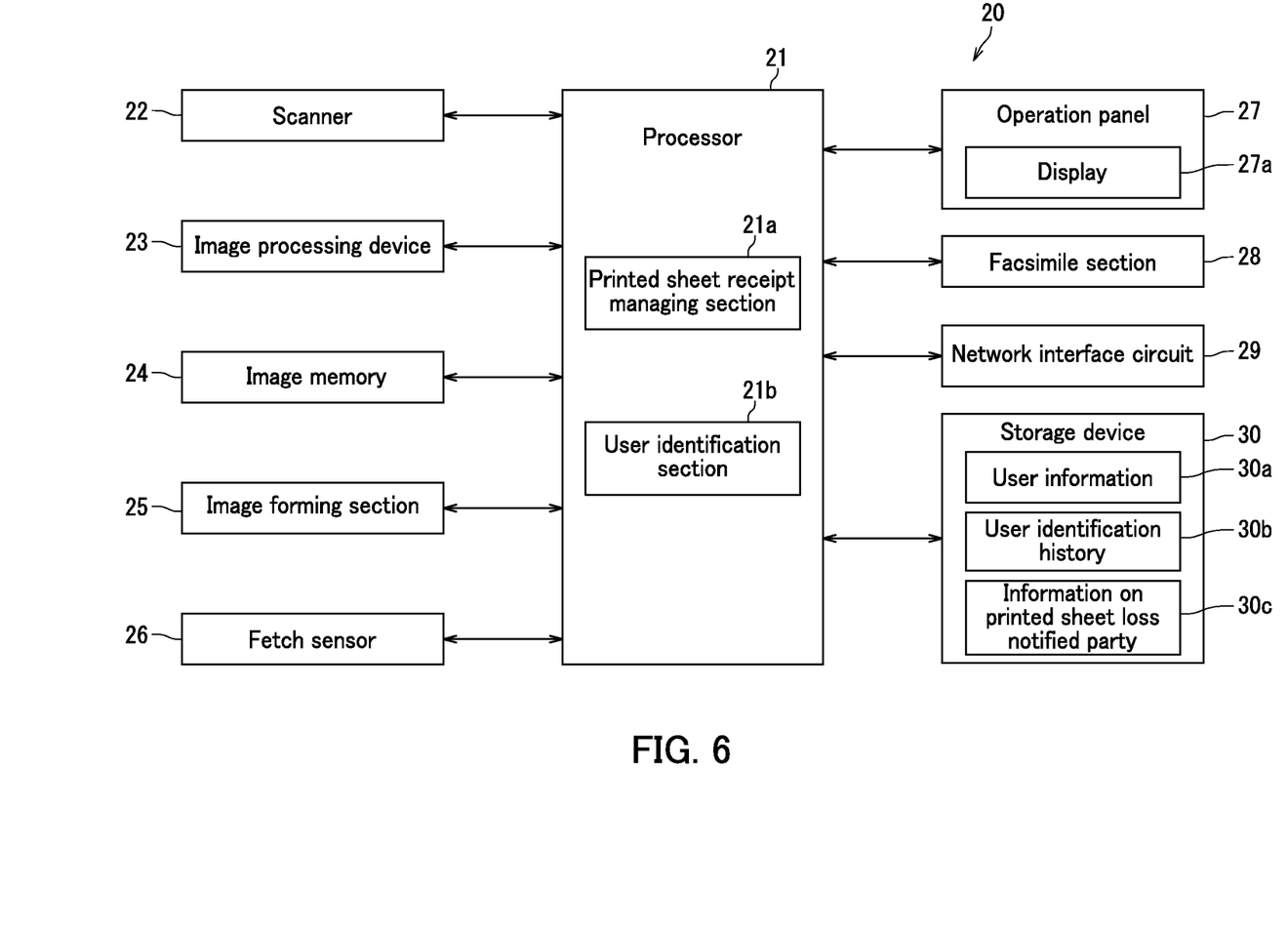
FIG. 6 illustrates a configuration of an image forming apparatus according to the present disclosure.

The configuration of the image forming apparatus 20 will be described with reference to FIG. 6. FIG. 6 is a structural diagram of the image forming apparatus 20. As illustrated in FIG. 6, the image forming apparatus 20 includes a scanner 22, an image processing device 23, an image memory 24, an image forming section 25, a fetch sensor 26, a processor 21, an operation panel 27, a facsimile section 28, a network interface circuit 29, and a storage device 30.

Each of the scanner 22, the image processing device 23, the image memory 24, the image forming section 25, the fetch sensor 26, the processor 21, the operation panel 27, the facsimile section 28, the network interface circuit 29, and the storage device 30 includes at least one circuit. Here, a circuit can be an electronic component or an electronic substrate on which a plurality of electronic devices are connected to one another by wires.

Besides, each of the scanner 22, the image processing device 23, and the operation panel 27 may include a circuit having a processor such as a central processing unit (CPU). A circuit having a processor can read various programs to execute them, and can execute various programs precedently incorporated therein.

The processor 21 includes a CPU, and a hardware circuit or the like dedicated for the image forming apparatus 20. The processor 21 controls the entire operation of the image forming apparatus 20 by executing a control program stored in the storage device 30.

The processor 21 is connected to the scanner 22, the image processing device 23, the image memory 24, the image forming section 25, the fetch sensor 26, the operation panel 27, a display 27a, the facsimile section 28, the network interface circuit 29, the storage device 30, and the like. The processor 21 controls the operations of these components connected thereto. In other words, the processor 21 sends/receives signals or data to/from these components.

The processor 21 controls the above-described components for executing various functions (such as a scanning function, a printing function, a copying function, and a facsimile sending/receiving function) based on job execution instructions input thereto by a user through the operation panel 27 or a PC or the like connected thereto via a network.

Besides, the processor 21 operates as a printed sheet receipt managing section 21a and a user identification section 21b by the CPU executing programs loaded from a read only memory (ROM) or the like to a random access memory (RAM).

The printed sheet receipt managing section 21a manages fetch of a printed sheet by using the fetch sensor 26. Besides, the printed sheet receipt managing section 21a issues a print completion notice, a notice of printed sheet taken away, and a printed sheet loss notice. In addition, the printed sheet receipt managing section 21a displays, in the display 27a, user information of another user that may have taken away a printed sheet of a given user.

The user identification section 21b executes a first identification process, a second identification process and a third identification process. In the first identification process, a user having issued a print instruction to the image forming apparatus 20 (i.e., a print requester) is identified. In the second identification process, a user fetching a printed sheet from the image forming apparatus 20 (i.e., a fetcher) is identified. In the third identification process, a user reporting loss of a printed sheet to the multifunctional peripheral 20 (i.e., a reporter) is identified.

The scanner 22 may be a circuit that reads an image from an original document and generates image data of the read image.

The image processing device 23 includes an application specific integrated circuit (ASIC). The image processing device 23 performs, as needed, image processing on the image data of the image read by the scanner 22. For example, the image processing device 23 performs image processing such as shading correction for improving the image quality attained in printing the image read by the scanner 22.

The image memory 24 temporarily stores image data. The image data refers to, for example, image data of an image read by the scanner 22, or image data of an image to be printed by the image forming section 25.

The image forming section 25 may be a circuit performing image formation based on the image data. The image formation is processing for forming (namely, printing) the image on a sheet.

If a printed sheet output to the exit tray of the image forming apparatus 20 is fetched by a user or the like and the exit tray becomes empty, the fetch sensor 26 detects that the exit tray has emptied. The fetch sensor 26 is, for example, a transmission sensor.

The operation panel 27 includes a touch panel section and an operation key section. The touch panel section and the operation key section accept instructions from a user for various operations and processing executable by the image forming apparatus 20. The touch panel section includes the display 27a. The display 27a includes, for example, a liquid crystal display (LCD) on which a touch panel is provided.

The facsimile section 28 may be a circuit including an encoding/decoding section, a modulation/demodulation section, and an NCU (Network Control Unit) all not shown. The facsimile section 28 performs facsimile transmission through a public telephone network.

The network interface circuit 29 includes a communication module (such as a LAN board). The network interface circuit 29 sends/receives various data to/from devices (for example, PCs) disposed in a local area via a LAN or the like connected to the network interface circuit 29.

The storage device 30 is a memory having an area for storing various data. The storage device 30 stores, for example, the image data of the image read by the scanner 22. The storage device 30 includes semiconductor memory devices and a mass storage device (such as a hard disk drive (HDD)). The semiconductor memory devices are, for example, a RAM and a ROM. The RAM and the ROM may be included in the hardware circuit of the processor 21. The storage device 30 stores, as the various data, user information 30a, user identification history 30b, and information 30c on printed sheet loss notified party.

The user information 30a is used by the user identification section 21b for identifying a user.

The user identification history 30b refers to history of user identification performed by the user identification section 21b.

The information 30c on printed sheet loss notified party refers to information on destinations to be notified of loss of a printed sheet if a given user has issued a printed sheet loss issue to the image forming apparatus 20.

Figure 7:
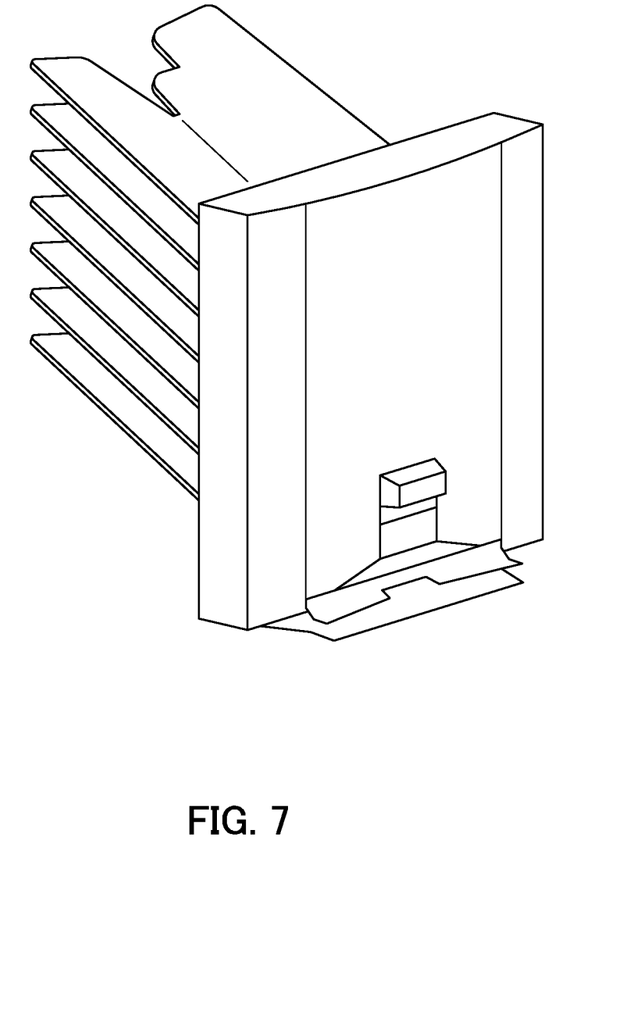
FIG. 7 illustrates an example of a mail box.

What has been described is the configuration of the image forming apparatus 20. In the description given above, the configuration in which printed sheets of all users are output to one exit tray is described, but the configuration of the image forming apparatus 20 is not limited to this configuration. The image forming apparatus 20 may employ, for example, a configuration in which printed sheets of respective users are respectively output to exit trays precedently set for the respective users. Specifically, the image forming apparatus 20 may include a mail box as illustrated in FIG. 7.

Process Flow

Figure 8A:
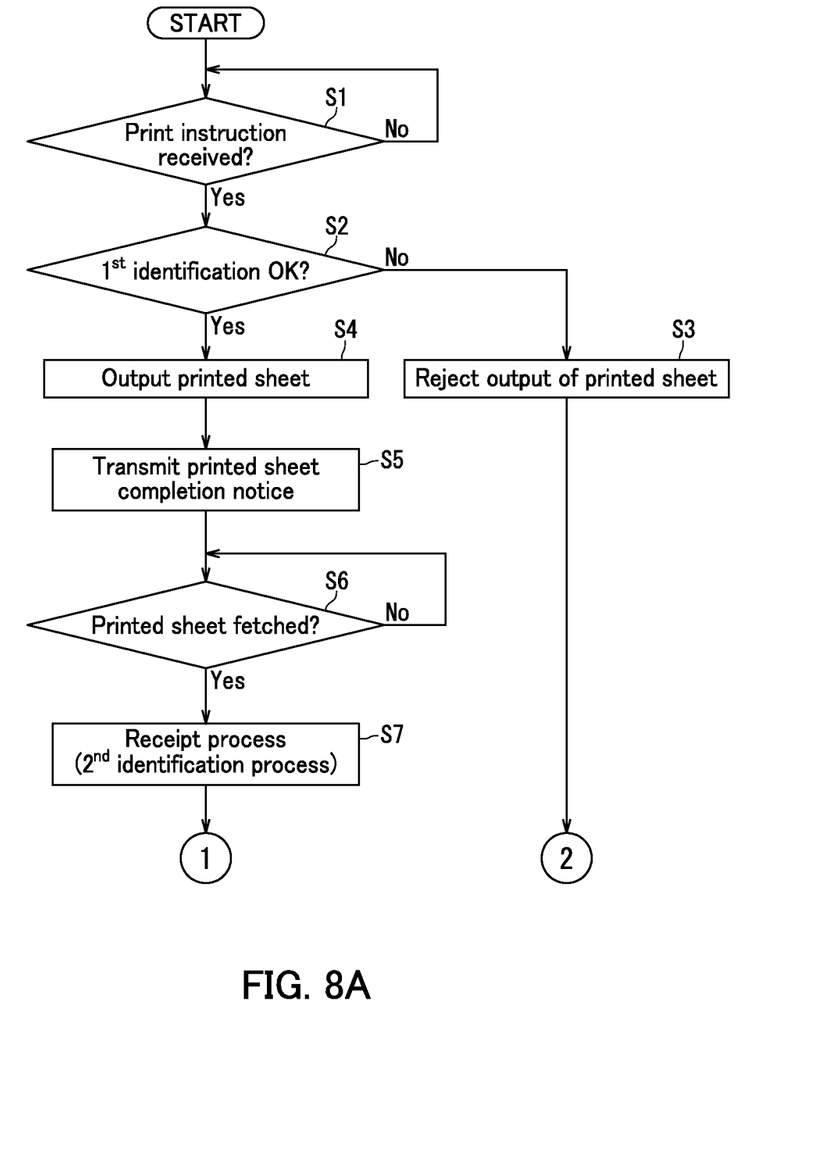
FIG. 8A illustrates a former half of steps of processing performed by the image forming apparatus of the present disclosure.
Figure 8B:
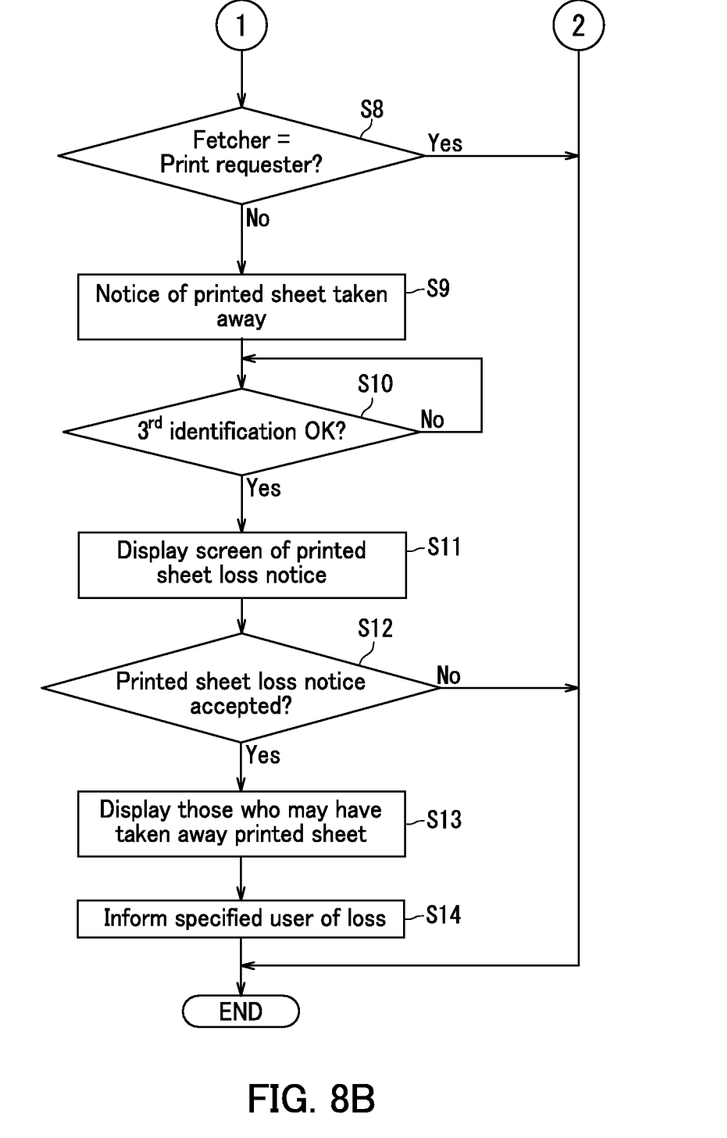
FIG. 8B illustrates a latter half of steps of processing performed by the image forming apparatus of the present disclosure.

Next, the flow of the processing performed by the image forming apparatus 20 will be described with reference to FIGS. 6, 8A and 8B. FIGS. 8A and 8B illustrate steps of the processing performed by the image forming apparatus 20.

First, the processor 21 determines whether or not a print instruction has been received from a PC used by a user (step S1).

If the print instruction has not been received (No in step S1), the processing returns to step S1. Then, the processor 21 waits for a print instruction.

If the print instruction has been received (Yes in step S1), the user identification section 21b determines whether or not user information (such as a user ID (identification), a password or the like) accompanying the print instruction accords with the user information 30a stored in the storage device 30. In other words, the user identification section 21b performs the first identification process (step S2).

If the user information accompanying the print instruction does not accord with the user information 30a, namely, if the first identification process fails (No in step S2), the processor 21 rejects to perform a printing operation (step S3). Then, the processing is completed.

If the user information accompanying the print instruction accords with the user information 30a, namely, if the first identification process succeeds (Yes in step S2), the processor 21 controls the image forming section 25 to perform a printing operation based on the print instruction. As a result, a printed sheet printed based on the print instruction is output to the exit tray of the image forming apparatus 20 (step S4).

Next, the printed sheet receipt managing section 21a sends a print completion notice to the PC of the user having issued the print instruction (step S5).

Subsequently, the printed sheet receipt managing section 21a detects, with the fetch sensor 26, whether or not the exit tray has emptied, so as to determine whether or not the printed sheet output to the exit tray of the image forming apparatus 20 has been fetched (step S6).

If the printed sheet output to the exit tray has not been fetched by the user (No in step S6), the processing returns to step S6. As a result, the printed sheet receipt managing section 21a waits for detection of fetch.

If the printed sheet output to the exit tray has been fetched by a user (Yes in step S6), the user identification section 21b performs, as a receipt process, the second identification process of the user having fetched the printed sheet (the fetcher) (step S7). Besides, the user identification section 21b determines, based on the result of the first identification process, whether or not the fetcher is identified as the user having issued the print instruction (namely, the print requester) (step S8). Incidentally, if the second identification process is not performed for a prescribed period of time in step S7, the processing may proceed to step S9.

If the fetcher is identified as the print requester (Yes in step S8), there occurs no problem, and hence the processing is completed.

If the fetcher is not identified as the print requester (No in step S8), the printed sheet receipt managing section 21a sends a notice of printed sheet taken away to the PC used by the user having issued the print instruction (step S9).

The user of the PC having received the notice of printed sheet taken away does not need to do anything if he/she has requested to take (fetch) the printed sheet.

On the other hand, if the printed sheet has been taken away against his/her intention, the user of the PC having received the notice of printed sheet taken away comes to an installation position of the image forming apparatus 20, so as to check whether or not his/her printed sheet remains around the exit tray of the image forming apparatus 20.

If the user finds that his/her printed sheet does not remain around the exit tray of the image forming apparatus 20 (namely, that his/her printed sheet has been taken away from the exit tray), the user performs the third identification process for reporting loss of the printed sheet to the image forming apparatus 20 (step S10).

If the third identification process fails (No in step S10), the processing returns to step S10. There, the image forming apparatus 20 performs the third identification process again.

On the other hand, if the third identification process succeeds (Yes in step S10), the printed sheet receipt managing section 21a presents, to the user, a screen for reporting the loss of the printed sheet (a screen for printed sheet loss issue) on the display 27a (step S11).

Next, the printed sheet receipt managing section 21a determines whether or not the image forming apparatus 20 has accepted the printed sheet loss issue through the operation panel 27 (step S12).

If the image forming apparatus 20 has not accepted the printed sheet loss issue through the operation panel 27 (No in step S12), the processing is completed.

On the other hand, if the image forming apparatus 20 has accepted the printed sheet loss issue through the operation panel 27 (Yes in step S12), the printed sheet receipt managing section 21a specifies, based on the user identification history 30b, other user(s) having performed the second identification process after outputting the printed sheet of the user having issued the printed sheet loss issue (namely, the reporter) to the exit tray. Then, the printed sheet receipt managing section 21a causes the display 27a to display a list of user information of the specified user(s) (step S13).

Besides, the printed sheet receipt managing section 21a sends, based on the information 30c on printed sheet loss notified party stored in the storage device 30, a notice that the printed sheet of the given user has been lost (printed sheet loss notice) to specific destinations (precedently determined party) (step S14).

A user having taken away the printed sheet of the other user by mistake perceives, in receiving the printed sheet loss notice, that he/she has taken away the printed sheet of the other, and hence, he/she can return the printed sheet to the proper user.

What has been described is the flow of the process performed by the image forming apparatus 20.

One Structure of Image Forming Apparatus

Figure 9:
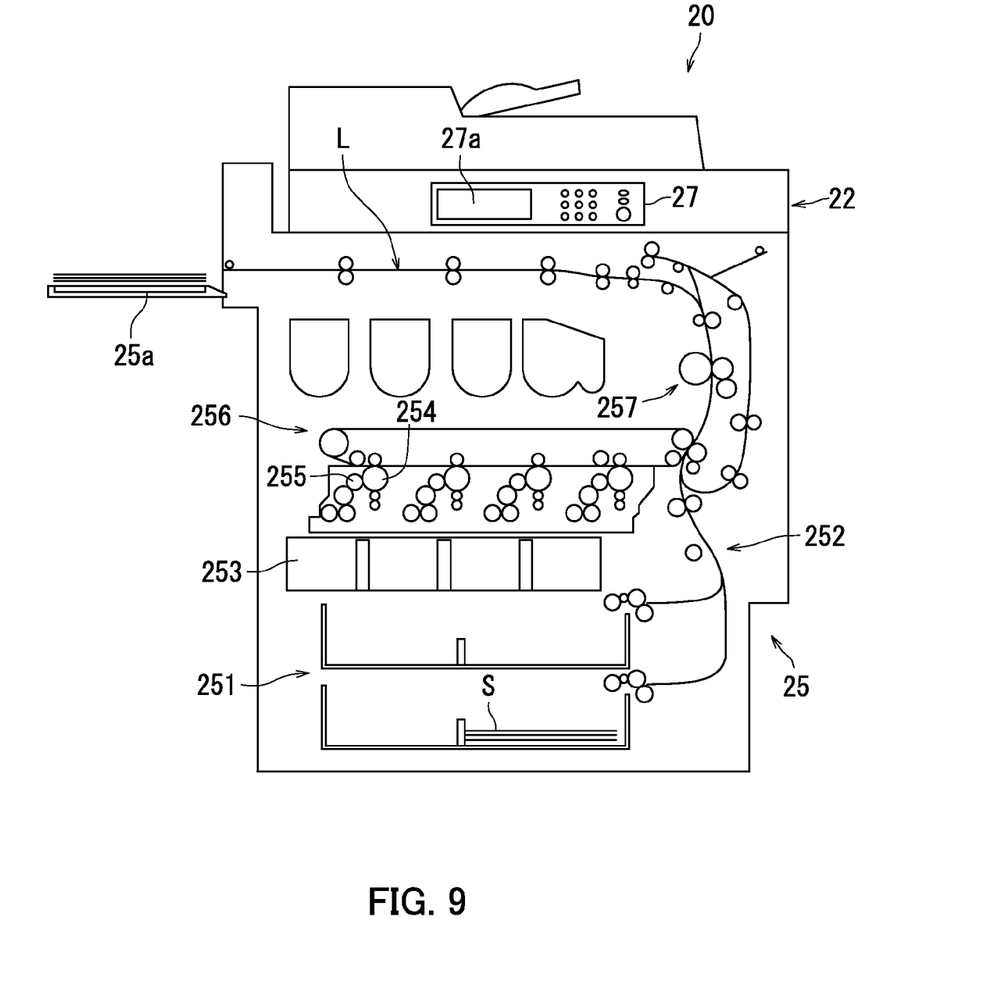
FIG. 9 illustrates a structure of the image forming apparatus of the present disclosure.

Next, an exemplary structure of the image forming apparatus 20 of the embodiment of the present disclosure will be described with reference to FIG. 9. FIG. 9 illustrates the structure of the image forming apparatus 20. The image forming apparatus 20 works, for example, a multifunction peripheral or a copying machine.

As illustrated in FIG. 9, the image forming apparatus 20 includes an exit tray 25a in addition to the scanner 22, the image forming section 25, and the operation panel 27.

The image forming section 25 includes, as a mechanism for executing a printing process on a sheet S, a paper feeding device 251, a conveyance device 252, an exposing device 253, a photosensitive drum 254, a developing unit 255, a transcriber 256, and a fixing device 257.

The paper feeding device 251 feeds a plurality of sheets S or the like to the conveyance device 252 one by one. The conveyance device 252 conveys the sheet S or the like fed from the paper feeding device 251 to the exit tray 25a. The exposing device 253 irradiates the photosensitive drum 254 based on image data to form an electrostatic latent image. The developing unit 255 develops the electrostatic latent image formed on the photosensitive drum 254 by supplying a toner to the photosensitive drum 254 to form a toner image. The transcriber 256 transfers the toner image formed on the photosensitive drum 254 onto the sheet S or the like. The fixing device 257 fixes the transferred toner image on the sheet S or the like. The sheet S or the like having the image formed thereon by the image forming section 25 (i.e., a printed sheet) is output to the exit tray 25a.

This is an exemplified structure of the image forming apparatus.

According to the present embodiment, a user having issued a print instruction can check whether or not his/her printed sheet has been taken away before warning party.

Note

The present disclosure is not limited to the above-described embodiment alone, and it goes without saying that various modifications and changes can be made within the scope of the present disclosure.

For example, although the structure of an electrophotographic image forming apparatus is described as the exemplified structure of the image forming apparatus in the embodiment of the present disclosure, the present disclosure is not limited to the electrophotographic image forming apparatus. The present disclosure is applicable to an inkjet type image forming apparatus.

What is claimed is:

1. An image forming apparatus comprising:
a housing;
an exit tray to which a printed sheet is output from the housing;
a network interface circuit that communicates with an outside device;
a storage device that stores user information to be used in identifying a user;
an image forming section that performs a printing operation based on a print instruction issued from a computer used by a user, and outputs, to the exit tray, a printed sheet printed based on the print instruction;
a processor that identifies a user by using the user information stored in the storage device; and
a fetch sensor capable of detecting that the printed sheet has been fetched from the exit tray, wherein
the image forming section and the processor are accommodated in the housing,
the processor sends, to the computer, a print completion notice corresponding to completion of the printing operation,
the processor executes a first identification process upon receiving the print instruction, the first identification process being a process for identifying a print requester corresponding to the user having issued the print instruction,
the processor executes a second identification process upon the printed sheet output to the exit tray being fetched, the second identification process being a process for identifying a fetcher corresponding to a user fetching the printed sheet from the exit tray,
the processor determines whether or not the fetcher identified by the second identification process is identical with the print requester identified by the first identification process, and
upon determining that the fetcher is different from the print requester, the processor sends, to the computer used by the print requester, a notice of printed sheet taken away notifying that the printed sheet has been taken away.

2. The image forming apparatus according to claim 1, further comprising:
an operation panel including a display,
wherein
the storage device stores user identification history corresponding to history of users having been identified by the processor,
the processor executes a third identification process after the notice of printed sheet taken away has been sent, the third identification process being a process for identifying the print requester who has lost the printed sheet printed based on the print instruction,
upon success of the third identification process, the processor determines whether or not a printed sheet loss issue has been accepted from the print requester identified by the third identification process through the operation panel, and
upon determining that the printed sheet loss issue has been accepted, the processor displays, based on the user identification history, a list of user(s) in the display, the list of user(s) showing user(s) having been identified by the second identification process after completion of the printing operation performed based on the print instruction issued by the print requester.

3. The image forming apparatus according to claim 2, wherein
the storage device stores information on printed sheet loss notified party corresponding to destinations to which a printed sheet loss notice is to be sent if a printed sheet is lost, and
in a situation in which the processor accepts the printed sheet loss issue from the print requester identified by the third identification process through the operation panel, the processor sends the printed sheet loss notice based on the information on the printed sheet loss notified party.

4. The image forming apparatus according to claim 2, wherein
upon success of the third identification process, the processor displays, in the display, a screen for a printed sheet loss issue for reporting loss of the printed sheet.

* * * * *